US008121129B2

(12) United States Patent
Paz et al.

(10) Patent No.: US 8,121,129 B2
(45) Date of Patent: Feb. 21, 2012

(54) OPTIMIZING THROUGHPUT OF DATA IN A COMMUNICATIONS NETWORK

(75) Inventors: Har'el Paz, Carmiel (IL); Konstantin Shagin, Haifa (IL)

(73) Assignee: International Business Machines Corporation, Armonk, NY (US)

(*) Notice: Subject to any disclaimer, the term of this patent is extended or adjusted under 35 U.S.C. 154(b) by 92 days.

(21) Appl. No.: 12/334,547

(22) Filed: Dec. 15, 2008

(65) Prior Publication Data
US 2010/0150150 A1    Jun. 17, 2010

(51) Int. Cl.
H04L 12/54 (2006.01)
(52) U.S. Cl. .................................. 370/395.42; 370/412
(58) Field of Classification Search .................. 370/394, 370/395.42, 412, 395.4
See application file for complete search history.

(56) References Cited

U.S. PATENT DOCUMENTS

| | | | |
|---|---|---|---|
| 5,455,865 A | 10/1995 | Perlman | |
| 5,875,329 A * | 2/1999 | Shan | 719/314 |
| 5,901,202 A * | 5/1999 | Lam | 379/22 |
| 6,246,702 B1 * | 6/2001 | Fellman et al. | 370/503 |
| 6,745,262 B1 * | 6/2004 | Benhase et al. | 710/40 |
| 6,891,799 B1 * | 5/2005 | Hagai et al. | 370/235 |
| 7,318,265 B2 * | 1/2008 | Takagi et al. | 29/403.1 |
| 7,319,669 B1 * | 1/2008 | Kunz et al. | 370/235 |
| 7,359,971 B2 | 4/2008 | Jorgensen | |
| 2004/0190548 A1 * | 9/2004 | Harel et al. | 370/466 |
| 2005/0018691 A1 * | 1/2005 | Riedl et al. | 370/395.42 |
| 2005/0169296 A1 * | 8/2005 | Katar et al. | 370/445 |
| 2006/0109864 A1 * | 5/2006 | Oksman | 370/474 |
| 2007/0025264 A1 * | 2/2007 | Cheng et al. | 370/252 |
| 2007/0230476 A1 * | 10/2007 | Ding | 370/394 |
| 2008/0256091 A1 * | 10/2008 | Kampmann et al. | 707/100 |
| 2008/0256272 A1 * | 10/2008 | Kampmann et al. | 710/57 |
| 2008/0294598 A1 * | 11/2008 | Imai | 707/2 |
| 2009/0010403 A1 * | 1/2009 | Jorgensen et al. | 379/88.23 |
| 2009/0055568 A1 * | 2/2009 | Subramanian et al. | 710/305 |
| 2009/0161684 A1 * | 6/2009 | Voruganti et al. | 370/412 |

FOREIGN PATENT DOCUMENTS

| | | |
|---|---|---|
| EP | 1303087 B1 | 1/2008 |
| WO | W00258325 | 7/2002 |

* cited by examiner

Primary Examiner — Chirag Shah
Assistant Examiner — Jay P Patel
(74) Attorney, Agent, or Firm — Jason Far-Hadian

(57) ABSTRACT

A method for transmitting data in a communications network is provided. The method comprises identifying a first data packet associated with a first transmission priority, wherein the first data packet encapsulates a plurality of messages designated for transmission to a destination; adding one or more additional messages to a second data packet associated with a second transmission priority to more optimally utilize capacity of the second data packet to encapsulate a plurality of messages, while the first data packet is being finalized for transmission, wherein the second transmission priority is less than the first transmission priority; and transmitting the first data packet before transmitting the second data packet.

11 Claims, 6 Drawing Sheets

OPTIMIZING THROUGHPUT OF DATA IN A COMMUNICATIONS NETWORK

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to data transmission in a communications network and, more particularly, to optimizing transmission throughput while complying with quality of service (QoS) requirements.

BACKGROUND

A messaging system in a network environment may deliver messages from an application to one or more destinations in the network environment. Messages are typically grouped together into a data packet that is then transmitted to a destination. Encapsulating messages in a packet helps reduce communication overhead, and improves the average rate of successful message delivery. The maximum size of a packet is usually determined by a network setting called the Maximum Transfer Unit (MTU).

It is generally desirable to add as many messages as possible (e.g., within an upper bound determined according to the MTU) to a packet to increase transmission throughput. A real-time messaging system, however, may transmit a packet that is underutilized (i.e., a packet that is not optimally filled with individual messages) in order to comply with QoS requirements.

QoS provides applications with the ability to prioritize messages to achieve a certain level of performance in network communications by assigning a priority parameter to a message. To comply with QoS, a messaging system generally transmits the most urgent packet first. The most urgent packet is the packet including a message with the highest priority relative to the other messages.

In existing messaging systems in which messages are assigned priority according to QoS, an application submits messages to a batching module for transmission to one or more destinations. The batching module aggregates the messages into data packets and forwards the packets to a scheduling module upon finalization. The scheduling module transmits received packets based on urgency so that the packet including the most urgent message is transmitted first.

The batching module finalizes a packet either when a packet reaches a predetermined size threshold or when a packet exceeds a certain time limit determined according to QoS. If the batching module finalizes a packet based on packet size, the scheduling module's transmission of the finalized packet may violate QoS because there may be another packet in the queue with a higher priority that has not met the size threshold.

On the other hand, if the batching module finalizes a packet according to a certain time limit, the batching module may forward an underutilized packet to the scheduling module. The underutilization occurs because the transmission of a finalized packet may be delayed due to the scheduling module being busy transmitting other more urgent packets. If additional messages that can be added to the finalized packet arrive during this waiting period, the new messages cannot be added to the finalized packet. That is, once a packet is finalized and forwarded to the scheduling module, the batching module may not add additional messages to the packet while the packet is waiting for transmission.

Systems and methods are needed to overcome the above-mentioned shortcomings.

SUMMARY

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for transmitting data in a communications network is provided. The method comprises identifying a first data packet associated with a first transmission priority, wherein the first data packet encapsulates a plurality of messages designated for transmission to a destination; adding one or more additional messages to a second data packet associated with a second transmission priority to more optimally utilize capacity of the second data packet to encapsulate a plurality of messages while the first data packet is being finalized for transmission, wherein the second transmission priority is less than the first transmission priority; and transmitting the first data packet before transmitting the second data packet.

In accordance with one embodiment, a method for transmitting data in a communications network is provided, identifying a first data packet associated with a first transmission priority, wherein the first data packet encapsulates a plurality of messages designated for transmission to a destination; and adding one or more additional messages to the first data packet to more optimally utilize capacity of the first data packet to encapsulate a plurality of messages, while a second data packet associated with a second transmission priority is being finalized for transmission, wherein the second transmission priority is less than the first transmission priority.

In accordance with another embodiment, a system comprising one or more logic units is provided. The one or more logic units are configured to perform the functions and operations associated with the above-disclosed methods. In accordance with yet another embodiment, a computer program product comprising a computer usable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
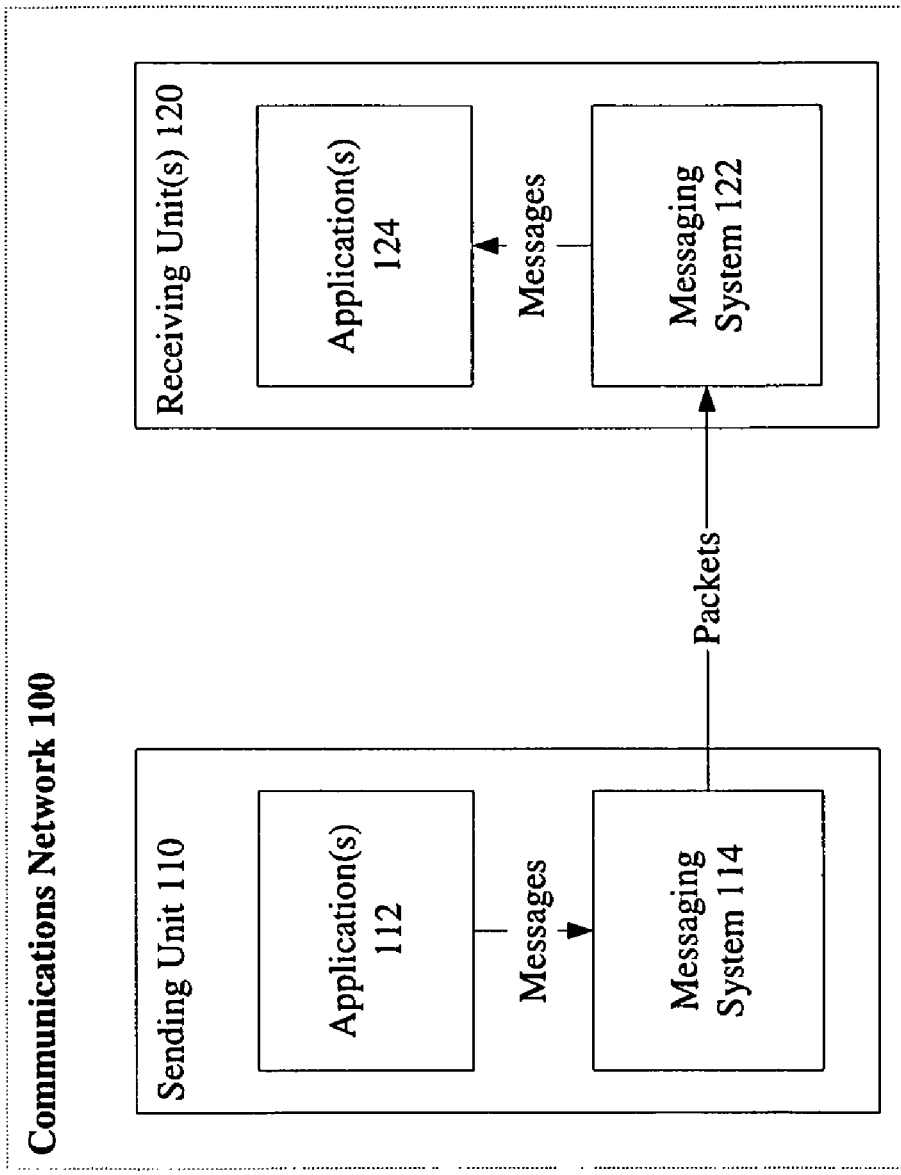
FIG. 1 is a block diagram of an exemplary communications network, in accordance with one or more embodiments.

Referring to FIG. 1, in accordance with one embodiment, an exemplary communications network 100 comprises a sending unit 110 and one or more receiving units 120 that transmit and receive data packets, respectively. Sending unit 110 and receiving units 120 may comprise one or more computing systems connected over one or more networks in communications network 100.

Sending unit 110 comprises one or more applications 112 that may submit messages to a messaging system 114 for transmitting packets to receiving units 120. Receiving units 120 each may comprise a messaging system 122 for receiving packets from messaging system 114 and forwarding messages to one or more applications 124.

Messaging system 114 batches messages submitted by applications 112, encapsulates a plurality of messages in individual data packets, and schedules the packets for transmission to one or more receiving units 120, desirably by way of a communications module (not shown). The communication module performs the batching, encapsulating, and the scheduling operations, for example. The communications module has control over each message submitted to the messaging system 114 and each packet generated for transmission by messaging system 114.

In one embodiment, the batching, encapsulating, and scheduling are performed by the communications module so that the messages may be added to a packet until the packet is finalized for transmission. Desirably, a packet is not finalized for transmission until the packet is designated as the most urgent packet. In this manner, optimal batching is achieved for most packets because additional messages may be added to the packet to take advantage of the full encapsulation capacity for each packet while a packet is waiting for transmission. In other words, packet finalization is delayed until it is time to transmit the packet such that, after the packet is finalized, the packet need not wait in a queue behind other packets for transmission.

Figure 2:
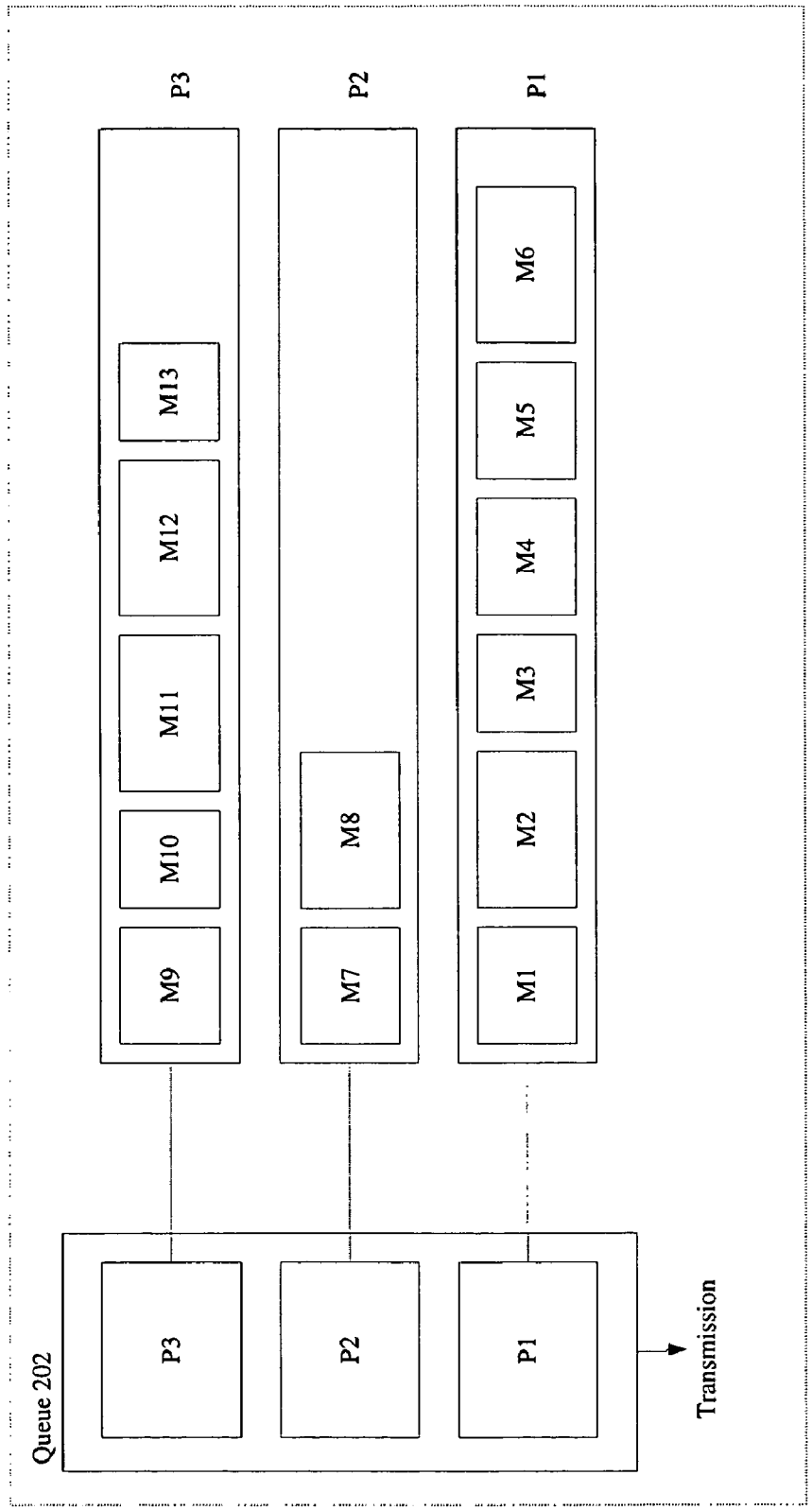
FIG. 2 illustrates an exemplary block diagram of messages grouped in one or more packets queued for transmission, in accordance with one embodiment.

Referring to FIG. 2, in accordance with one embodiment, an exemplary communications module (not shown) for batching and encapsulating messages and scheduling transmission of data packets may be implemented to manage packetizing of messages (e.g., M1 through M13) and scheduling of packets (e.g., P1, P2, and P3) for transmission in a queue 202.

The communications module batches and encapsulates the messages into packets according to destination. The number of messages that may be added to a packet is dependent on the size of the messages and the size of the packet (i.e., the packet's encapsulation capacity). As shown in FIG. 2, messages M1 through M8, which are designated for a first set of receiving units, may be added to two different packets. For example, messages M1 through M6 are added to packet P1, while messages M7 and M8 are added to packet P2. Messages M9 through M13, which are designated for a second set of receiving units, are added to packet P3.

The communications module identifies the most urgent packet for transmission and desirably sorts generated packets in order of urgency such that the most urgent packet is located at the head of queue 202. Urgency of a packet is determined by priority of messages included in the packet. In FIG. 2, for example, packet P1 is the most urgent packet because packet P1 includes message M1 that has the highest priority among messages M1 through M13. Please note that, in most cases, messages included in the same packet have approximately the same priority.

Referring to FIGS. 1 through 3A, in accordance with one embodiment, applications 112 submit a plurality of messages to messaging system 114 for transmission to receiving units 120. Once messaging system 114 receives the messages (P300), the communications module encapsulates the messages into data packets (P310) and identifies the most urgent packet by locating the message with the highest priority (P320). The communications module transmits the most urgent packet before any other packet, providing other pending packets that are underutilized with an opportunity to accumulate more messages while waiting for the most urgent message to be transmitted (P330).

In one embodiment, if an underutilized packet is designated as the most urgent packet, the communications module may transmit the underutilized packet even if optimal batching is not achieved. In an alternative embodiment, applications 112 may assign additional QoS parameters defining a value K, so that the communications module is provided with the option to transmit a packet that is the most optimized (i.e., most full of messages) from among K most urgent packets instead of limiting the communications module to transmitting the most urgent packet.

That is, in one embodiment, the communications module may be configured to transmit a packet that is better optimized than the most urgent packet before the most urgent packet, providing the most urgent packet with the opportunity to accumulate more messages. For example, in accordance with one embodiment, the communications module may transmit the most optimized packet from among K most urgent packets, transmitting the more urgent packet if there is a tie in optimization between the packets.

The value of K may be adjusted to control flexibility associated with the QoS requirements. For example, the value of K may be incremented to increase the capacity or average size of transmitted packets (i.e., throughput of data) and thereby decrease the number of overall packet transmissions.

Assume, for example, that the value of K is 3 and that there are five packets P1, P2, P3, P4, and P5, such that P1 is the most urgent packet and P5 is the least urgent packet. Also assume that, in this example, priority corresponds to delivery deadlines determined according to QoS requirements and that P1 is the least optimized packet with a delivery deadline at time 00:30.

Since the value of K is 3, P1, P2, and P3 are the K most urgent packets. Accordingly, the communications module transmits P2 and P3 before P1, in accordance with one embodiment. Assuming a packet may be transmitted every 15 seconds, if P3 is transmitted at time 00:00 and P2 is transmitted at time 00:15, P1 is transmitted at time 00:30. In this scenario, P1 has 30 seconds to become better optimized (i.e., more fully utilize its encapsulation capacity) while waiting to be transmitted according to the transmission schedule (i.e., without any delay).

Please note, however, that if the value of K is incremented to 4, P1 will have 15 additional seconds, in this example, to become better optimized. Thus, if there are three other packets that are more fully optimized than P1, then P1 will be transmitted at time 00:45, fifteen seconds past its delivery deadline. Thus, if the value K is too large, packets are more likely to be transmitted past QoS time thresholds.

To avoid the above-mentioned problem, consideration of packet optimization may be limited to certain instances. For example, in accordance with one embodiment, the communications module may limit delayed transmission to instances where transmitting a better optimized packet from among K most urgent packets instead of the most urgent packet does not prevent the most urgent packet from being transmitted within a QoS time threshold.

Figure 3A:
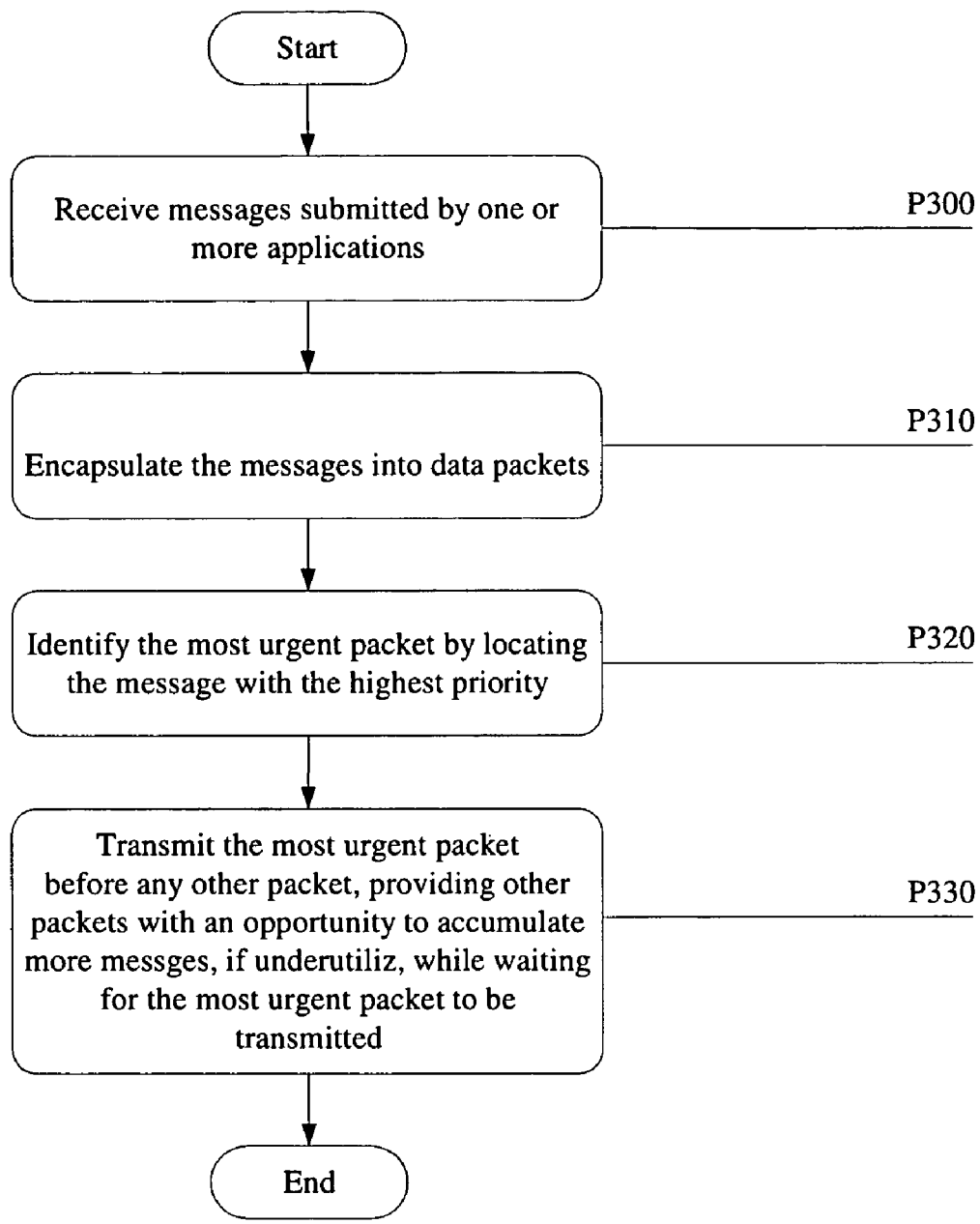
FIGS. 3A and 3B are flow diagrams of one or more exemplary methods for transmitting data packets in a communications network, in accordance with one or more embodiments.
Figure 3B:
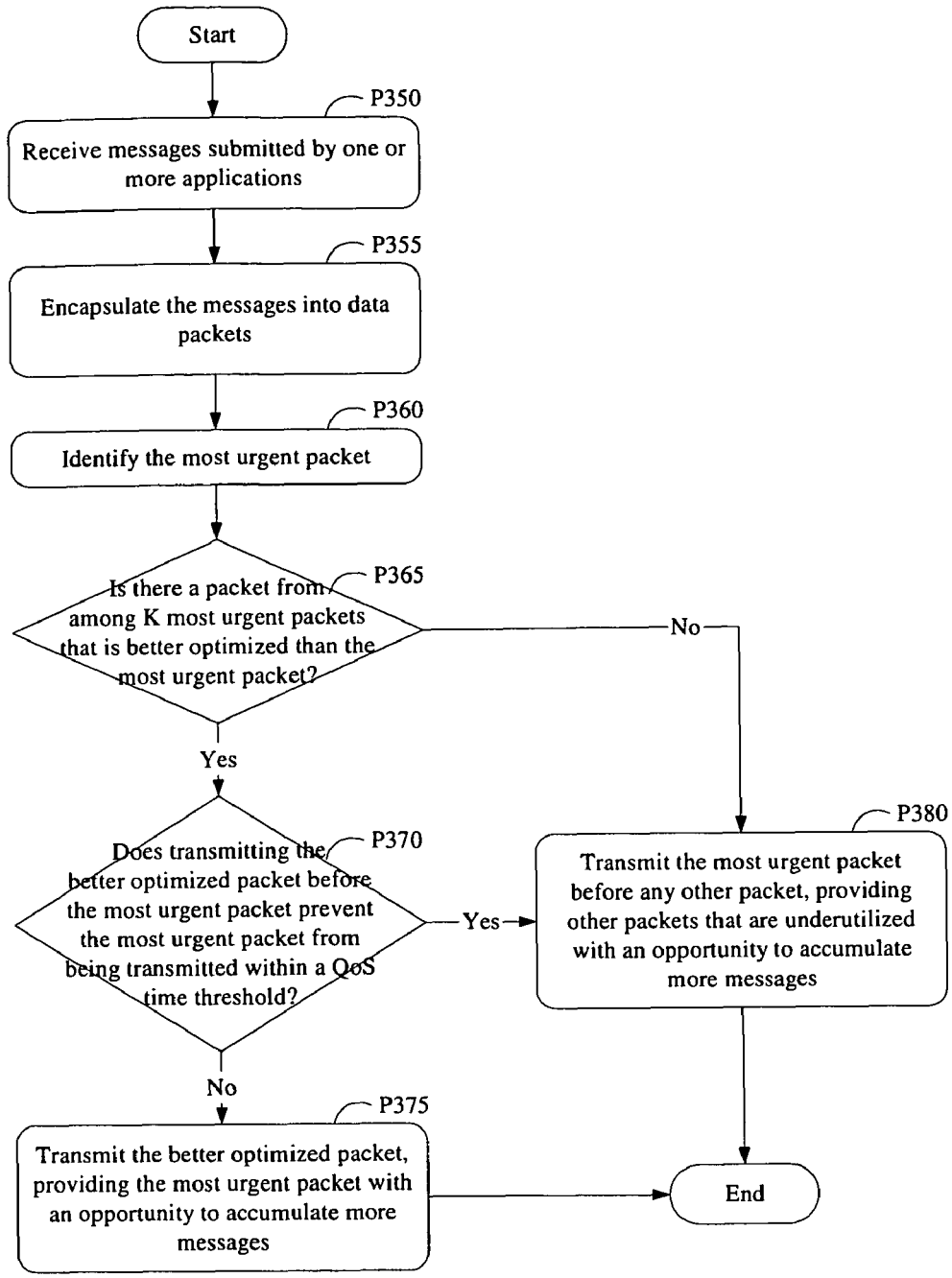

FIG. 3B illustrates transmission of data with QoS relaxation, in accordance with one embodiment. Referring to FIGS. 1 and 3B, applications 112 may submit a plurality of messages to messaging system 114 for transmission to receiving units 120. Once messaging system 114 receives the messages (P350), the communications module encapsulates the messages into data packets (P355) and identifies the most urgent packet by locating the message with the highest priority (P360).

If there is a better optimized packet from among K most urgent packets (P365) and transmitting the better optimized packet before the most urgent packet does not prevent the most urgent packet from being transmitted within a QoS time threshold (P370), the communications module transmits the better optimized packet, providing the most urgent packet with the opportunity to accumulate more messages (P375). Otherwise, the communications module transmits the most urgent packet before any other packet, providing other pending packets that are underutilized with the opportunity to accumulate more messages (P380).

Different embodiments may be implemented either entirely in the form of hardware or entirely in the form of software, or a combination of both hardware and software elements. For example, sending unit 110 and receiving units 120 in communications network 100 may each comprise a controlled computing system environment that may be presented largely in terms of hardware components and software code executed to perform processes that achieve the results contemplated by the system of the present invention.

Figure 4:
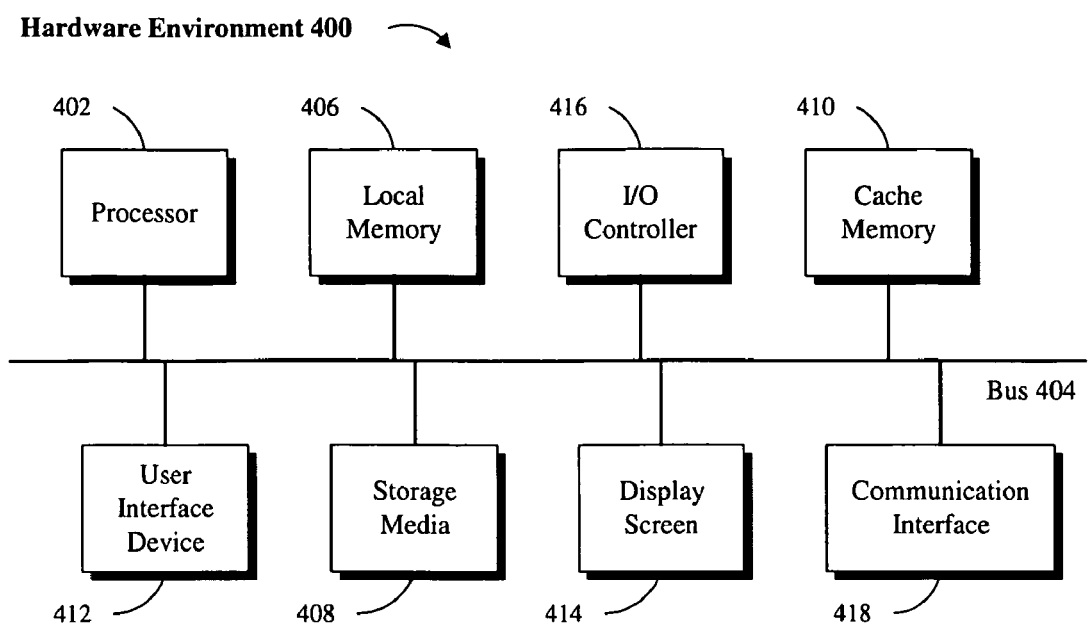
FIGS. 4 and 5 are block diagrams of hardware and software environments in which a system of the present invention may operate, in accordance with one or more embodiments.
Figure 5:
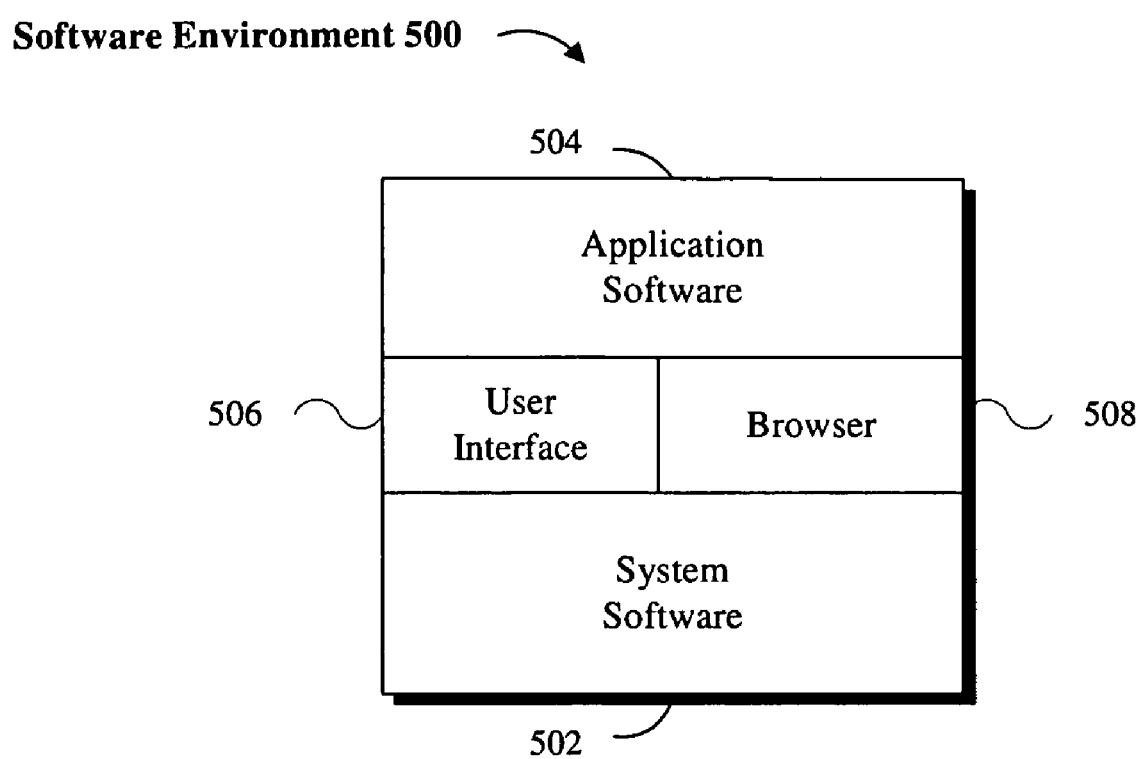

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, the communications module, applications 112 and 124, and messaging systems 114 and 122 provided above may be implemented as system software 502 or application software 504 executed on one or more hardware environments to facilitate data integrity validation using hierarchical volume management. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, may comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 may comprise one or more computer programs that are executed on top of an operating system after being loaded from storage media 408 into local memory 406. In a client-server architecture, application software 504 may comprise client software and server software. For example, in one embodiment of the invention, if sending unit 110 is a server and receiving units 120 are clients, server software 504 may be executed on sending unit 110 and client software may be executed on receiving units 120.

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Each module may be implemented as a single or a plurality of individual modules, whether in form of hardware software or a combination thereof. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention may be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method comprising:
    constructing a first data packet, using one or more computing processor, wherein the first data packet encapsulates a first set of messages designated for transmission to a first destination in a communications network;
    constructing a second data packet, using one or more computing processor, wherein the second data packet encapsulates a second set of messages designated for transmission to second destination in the communications network;
    determining that a first transmission priority associated with the first data packet is higher than a second transmission priority associated with the second data packet; and
    in response to determining that the second data packet is more utilized than the first data packet and determining that transmitting the second data packet prior to the first data packet does not prevent the first data packet from being transmitted within a time threshold:
        finalizing the second data packet such that additional messages are prohibited from being added to the second data packet; and
        delaying finalization of the first data packet such that additional messages are permitted to be added to the first data packet after the second data packet is finalized,
    wherein the data packets are stored in a non-transitory storage medium.

2. The method of claim 1, further comprising:
in response to determining that the first data packet is more utilized than the second data packet:
    finalizing the first data packet such that additional messages are prohibited from being added to the first data packet; and
    delaying finalization of the second data packet such that additional messages are permitted to be added to the second data packet after the first data packet is finalized.

3. The method of claim 2, further comprising:
in response to determining that transmitting the second data packet prior to the first data packet prevents the first data packet from being transmitted within the time threshold:
    finalizing the first data packet such that additional messages are prohibited from being added to the first data packet; and
    delaying finalization of the second data packet such that additional messages are permitted to be added to the second data packet after the first data packet is finalized.

4. The method of claim 3, wherein the time threshold is assigned according to QoS requirements.

5. A system comprising:
    one or more processors coupled to one or more storage mediums, wherein the one or more processors are configured for communication of data packets in a communications network, wherein the data packets comprise at least a first data packet and a second data packet, and wherein the data packets are stored in said one or more storage mediums;
    a logic unit for constructing the first data packet, wherein the first data packet encapsulates a first set of messages designated for transmission to a first destination;
    a logic unit for constructing the second data packet, wherein the second data packet encapsulates a second set of messages designated for transmission to second destination;
    a logic unit for determining that a first transmission priority associated with the first data packet is higher than a second transmission priority associated with the second data packet; and
    a logic unit for finalizing the first data packet such that additional messages are prohibited from being added to the first data packet, in response to determining that the second data packet is more utilized than the first data packet and determining that transmitting the second data packet prior to the first data packet does not prevent the first data packet from being transmitted within a time threshold; and
    a logic unit for delaying finalization of the second data packet such that additional messages are permitted to be added to the second data packet after the first data packet is finalized, in response to determining that the second data packet is more utilized than the first data packet and determining that transmitting the second data packet prior to the first data packet does not prevent the first data packet from being transmitted within a time threshold; and a transmitter for transmitting the plurality of data packets.

6. The system of claim 5, wherein transmission priorities are assigned according to quality of service (QoS) requirements.

7. The system of claim 5, further comprising:
a logic unit for determining whether the second data packet is more utilized than the first data packet; and
a logic unit for determining whether transmitting the second data packet prior to the first data packet prevents the first data packet from being transmitted within a time threshold.

8. The system of claim 7, wherein the time threshold is assigned according to QoS requirements.

9. A computer program product comprising a non-transitory computer readable storage medium having a computer readable program, wherein the computer readable program when executed on a computer causes the computer to:
construct a first data packet, wherein the first data packet encapsulates a first set of messages designated for transmission to a first destination;
construct a second data packet, wherein the second data packet encapsulates a second set of messages designated for transmission to second destination;
determine that a first transmission priority associated with the first data packet is higher than a second transmission priority associated with the second data packet; and
finalize the first data packet such that additional messages are prohibited from being added to the first data packet, in response to determining that the second data packet is more utilized than the first data packet and determining that transmitting the second data packet prior to the first data packet does not prevent the first data packet from being transmitted within a time threshold; and
delay finalization of the second data packet such that additional messages are permitted to be added to the second data packet after the first data packet is finalized, in response to determining that the second data packet is more utilized than the first data packet and determining that transmitting the second data packet prior to the first data packet does not prevent the first data packet from being transmitted within a time threshold.

10. The computer program product of claim 9, wherein transmission priorities are assigned according to quality of service (QoS) requirements.

11. The computer program product of claim 9, wherein the computer readable program when executed on a computer further causes the computer to:
determine whether the second data packet is more utilized than the first data packet; and
determine whether transmitting the second data packet prior to the first data packet prevents the first data packet from being transmitted within a time threshold.

* * * * *